United States Patent
Bradley et al.

(10) Patent No.: US 9,483,687 B2
(45) Date of Patent: *Nov. 1, 2016

(54) ENSURING A DESIRED DISTRIBUTION OF IMAGES IN A MULTIMEDIA DOCUMENT UTILIZING FACIAL SIGNATURES

(71) Applicant: International Business Machines Corporation, Armonk, NY (US)

(72) Inventors: Lisa M. Bradley, Cary, NC (US); Brian O'Donovan, Dublin (IE); Aaron J. Quirk, Cary, NC (US); Lin Sun, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/822,147

(22) Filed: Aug. 10, 2015

(65) Prior Publication Data

US 2016/0259964 A1 Sep. 8, 2016

Related U.S. Application Data

(63) Continuation of application No. 14/635,942, filed on Mar. 2, 2015.

(51) Int. Cl.
*G06K 9/00* (2006.01)
*G06F 17/30* (2006.01)

(52) U.S. Cl.
CPC ..... *G06K 9/00221* (2013.01); *G06F 17/30056* (2013.01); *G06F 17/30247* (2013.01); *G06K 9/00* (2013.01)

(58) Field of Classification Search
CPC .......... G06Q 30/0621; G06Q 20/40145; G06Q 20/085; G06T 11/60; G06T 1/0071; G06T 2207/30201; G06T 7/0044; H04N 19/00; H04N 1/00037; H04N 1/32251; H04N 1/32149; H04N 2201/3205; H04N 2201/3226; H04N 1/00281; H04N 9/8205; G06F 17/30017; G06F 7/08; G06F 7/1016; G06F 17/22; G06F 17/30887; G06F 21/32; G06F 17/30259; G06F 17/30265; G06F 17/30247; G06F 17/30253; G06F 17/30256; G06F 3/0482; G06K 19/06037; G06K 2209/27; G06K 9/00442; G06K 9/00463; G06K 9/4642; G06K 9/00577; G06K 15/00; G06K 9/00; G06K 9/00288; G06K 9/62; G06K 9/627; G06K 9/00248; G06K 9/00912; G06K 9/00281; G06K 9/00677; G06K 9/00228; G06K 9/6267; H04L 63/123; H04L 51/04; H04L 63/0861; H04L 65/403; Y10S 707/99945; H04H 60/33; G11B 27/28; H04M 3/564; G10H 2210/086; G10H 2240/056; G06N 7/005
USPC ....... 382/115, 118, 159, 190, 224, 225, 226, 382/282; 715/204, 209
See application file for complete search history.

(56) References Cited

U.S. PATENT DOCUMENTS 5,293,475 A * 3/1994 Hennigan ............... G06T 11/60
 358/451
5,898,430 A * 4/1999 Matsuzawa ....... G06F 17/30017
 707/E17.009

(Continued)

FOREIGN PATENT DOCUMENTS

WO 2008141109 A1 11/2008
WO 2009123711 A1 10/2009

OTHER PUBLICATIONS

Office Action for U.S. Appl. No. 14/635,942 dated Apr. 22, 2016, pp. 1-36.

(Continued)

*Primary Examiner* — Vu Le
*Assistant Examiner* — Aklilu Woldemariam
(74) *Attorney, Agent, or Firm* — Robert A. Voigt, Jr.; Winstead, P.C.

(57) ABSTRACT

A method, system and computer program product for ensuring a desired distribution of images in a multimedia document (e.g., yearbook, slideshow). A desired distribution of facial signatures in a multimedia document to be created by the user is received. Upon receiving an image to be added to the multimedia document by the user, a facial signature for a face detected in the image is generated. The current number of instances of the facial signature in the multimedia document is then determined. A determination is then made as to whether the current number of instances of the facial signature meets the desired distribution. An indication is then provided to the user as to whether the current number of instances of the facial signature meets or does not meet the desired distribution. In this manner, the user can ensure a desired distribution of images in the multimedia document.

8 Claims, 5 Drawing Sheets

(56) References Cited

U.S. PATENT DOCUMENTS

| | | | | |
|---|---|---|---|---|
| 6,173,068 B1* | 1/2001 | Prokoski | ................ | A61B 5/015 |
| | | | | 382/115 |
| 6,633,655 B1* | 10/2003 | Hong | ................... | G02B 27/225 |
| | | | | 348/E13.022 |
| 7,143,353 B2* | 11/2006 | McGee | ............ | G06F 17/30814 |
| | | | | 348/E5.108 |
| 8,379,937 B1 | 2/2013 | Moon et al. | | |
| 8,565,539 B2 | 10/2013 | Chao et al. | | |
| 8,644,622 B2* | 2/2014 | Perronnin | ......... | G06F 17/30244 |
| | | | | 382/181 |
| 2003/0101164 A1* | 5/2003 | Pic | ................... | G06F 17/30017 |
| 2003/0103645 A1* | 6/2003 | Levy | ................ | G06F 17/30876 |
| | | | | 382/100 |
| 2003/0105739 A1* | 6/2003 | Essafi | ..................... | G06F 21/64 |
| 2004/0062520 A1* | 4/2004 | Gutta | .................. | G11B 27/034 |
| | | | | 386/249 |
| 2004/0169683 A1* | 9/2004 | Chiu | ................ | G06F 17/30017 |
| | | | | 715/776 |
| 2006/0251338 A1* | 11/2006 | Gokturk | ............ | G06F 17/30253 |
| | | | | 382/305 |
| 2008/0304808 A1 | 12/2008 | Newell et al. | | |
| 2011/0038550 A1* | 2/2011 | Obrador | ............ | G06F 17/30274 |
| | | | | 382/225 |
| 2011/0069085 A1 | 3/2011 | Weber et al. | | |
| 2011/0116690 A1* | 5/2011 | Ross | .................. | G06K 9/00295 |
| | | | | 382/118 |
| 2012/0328168 A1* | 12/2012 | Dailey | ................... | G06T 11/60 |
| | | | | 382/118 |
| 2013/0050745 A1 | 2/2013 | Cok et al. | | |
| 2013/0322707 A1 | 12/2013 | Phillips et al. | | |
| 2013/0346412 A1* | 12/2013 | Raichelgauz | ..... | G06F 17/30705 |
| | | | | 707/737 |
| 2014/0153832 A1* | 6/2014 | Kwatra | ................... | G06T 11/00 |
| | | | | 382/195 |

OTHER PUBLICATIONS

4K Slideshow Maker, "Create Impressive Slideshows, Save Your Memories," http://www.4kdownload.com/products/product-slideshowmaker, 2014, pp. 1-2.

Bahrampour, Tara, "Can Your Face Reveal How Long You'll Live? New Technology may Provide the Answer," http://www.washingtonpost.com/national/health-science/can-your-face-reveal-how-long-youll-live-new-technology-may-provide-the-answer/2014/07/02/640bacb4-f748-11e3-a606-946fd632f9f1_story.html, Jul. 2, 2014, pp. 1-14.

Berkowitz et al., "How Old Does Your Face Look? A New Twist on Longevity," http://www.washingtonpost.com/national/health-science/how-old-does-your-face-look-a-twist-on-longevity/2014/07/02e6567160-01f5-11e4-8572-4b1b969b6322_graphic.html, Jul. 2, 2014, pp. 1-5.

List of IBM Patents or Patent Applications Treated as Related, Aug. 10, 2015, pp. 1-2.

* cited by examiner

ENSURING A DESIRED DISTRIBUTION OF IMAGES IN A MULTIMEDIA DOCUMENT UTILIZING FACIAL SIGNATURES

TECHNICAL FIELD

The present invention relates generally to creating multimedia documents, and more particularly to ensuring a desired distribution of images in a multimedia document (e.g., yearbook, slideshow, video, website) utilizing facial signatures.

BACKGROUND

Generating a multimedia document, such as a yearbook or slideshow, that includes a set of images that is representative of all the individuals that belong to a group (e.g., sports team, class, school) is difficult, especially when the size of the group is large. For example, it takes a lot of effort and time in creating a yearbook for the graduating class of a high school that includes pictures of class members and school activities (e.g., sports). The creator(s) of the yearbook may want to ensure that a particular class member is not overly or inadequately represented in comparison to the other class members in order to provide fairness and increase member enjoyment. For example, the creator(s) of the yearbook may want to ensure that the yearbook does not include many images of a particular class member (e.g., twenty pictures of an individual) while only including a single image of another class member. However, the creator(s) of the yearbook may have hundreds or thousands of images of hundreds of class members to choose to include in the yearbook. As a result, it may be overwhelming for the creator(s) of the yearbook to ensure that each class member is adequately represented in the yearbook and that there are not some class members that are overly represented in the yearbook.

Currently, a multimedia document, such as a slideshow, may be generated by selecting an image for inclusion in the slideshow, where the image has associated facial detection information. A face location is determined in the selected image based on the facial detection information and the selected image is cropped based on the determined face location to generate a cropped image depicting the included face. The cropped image is inserted into a slide associated with the slideshow. However, there is not currently an approach in ensuring a specific distribution of images in the slideshow, such as ensuring a particular member of a group is not overly or insufficiently represented in the slideshow.

Furthermore, a multimedia document, such as a yearbook, may be designed and created utilizing a facial recognition module for identifying a subject in a photo and tagging the photo with an identity of the subject. Identifying the subject may include comparing the photo to a plurality of previously tagged photos to identify the subject. However, there is not currently an approach in ensuring a specific distribution of images in the yearbook. For example, there is not currently an approach in ensuring that each individual in the class includes a minimum number of images in the yearbook. Neither is there currently an approach in ensuring that there is a certain percentage of images out of the total number of images in the yearbook of a particular individual in the class.

Therefore, there is a need in the art for ensuring a desired distribution of images in a multimedia document (e.g., yearbook, slideshow, video, website).

BRIEF SUMMARY

In one embodiment of the present invention, a method for ensuring a desired distribution of images in a multimedia document comprises receiving a desired distribution of facial signatures in the multimedia document. The method further comprises receiving an image to be added to the multimedia document. The method additionally comprises inspecting the image for instances of faces. Furthermore, the method comprises generating a facial signature for a face detected in the image. Additionally, the method comprises determining a number of instances of the facial signature in the multimedia document. In addition, the method comprises determining, by a processor, a desired distribution for the facial signature in the multimedia document based on the received desired distribution of facial signatures in the multimedia document. The method further comprises providing an indication that the number of instances of the facial signature in the multimedia document meets or does not meet the desired distribution for the facial signature in the multimedia document based on the number of instances of the facial signature in the multimedia document and the desired distribution for the facial signature in the multimedia document. In this manner, the user can ensure a desired distribution of images in the multimedia document (e.g., yearbook, slideshow, video, website).

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

Figure 1:
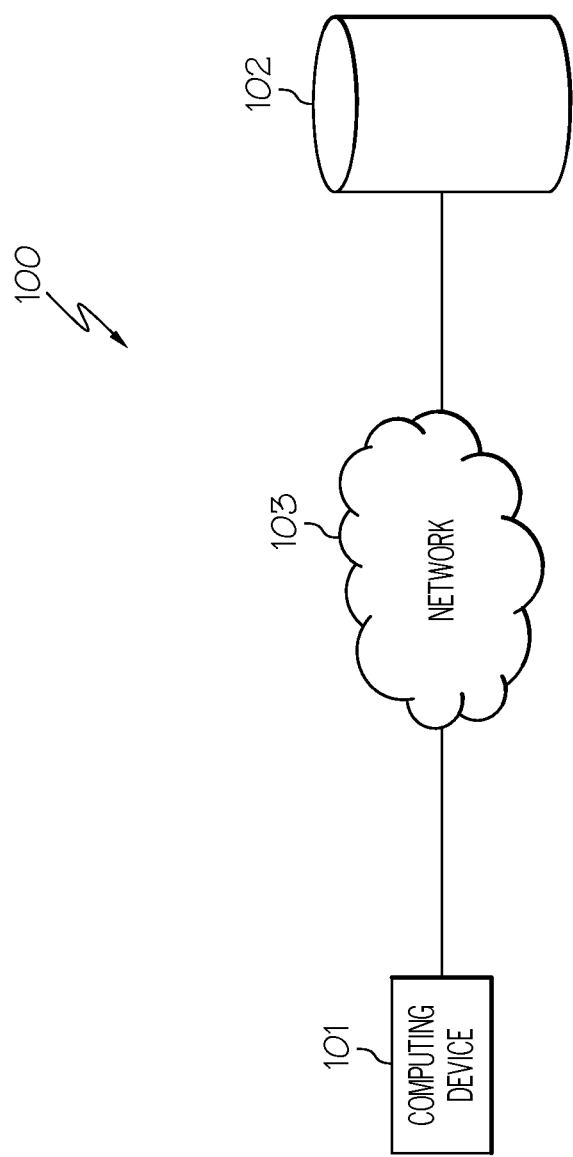
FIG. 1 illustrates a network system configured in accordance with an embodiment of the present invention.

The present invention comprises a method, system and computer program product for ensuring a desired distribution of images in a multimedia document (e.g., yearbook, slideshow, video, website). In one embodiment of the present invention, a desired distribution of facial signatures in a multimedia document to be created by the user is received. For example, the user may specify that all facial signatures should have 5 to 10 occurrences in the multimedia document. Upon receiving an image to be added to the multimedia document by the user, a facial signature for a face detected in the image is generated, such as by using a facial recognition algorithm. The current number of instances of the facial signature in the multimedia document is then determined. The desired distribution of the facial signature (the facial signature generated) is determined based on the received desired distribution of the facial signatures in the multimedia document. For example, the desired distribution of the facial signatures in the multimedia document may indicate that the number of images of such a facial signature to be included in the multimedia document is to correspond to the average number of images of the other facial signatures used in the multimedia document. A determination is then made as to whether the current number of instances of the facial signature meets the desired distribution. An indication is then provided to the user as to whether the current number of instances of the facial signature meets or does not meet the desired distribution. If the number of instances of the facial signature does not meet the desired distribution, then images from a set of source images with a facial signature that match the generated facial signature may be provided to the user to be added to the multimedia document if the current number of instances of the facial signature is below the desired distribution. Alternatively, images from the multimedia document with a facial signature that match the generated facial signature may be displayed to the user to be removed from the multimedia document if the current number of instances of the facial signature is above the desired distribution. In this manner, the user can ensure a desired distribution of images in the multimedia document (e.g., yearbook, slideshow, video, website).

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Referring now to the Figures in detail, FIG. 1 illustrates a network system 100 configured in accordance with an embodiment of the present invention. Network system 100 includes a computing device 101 connected to a database 102 via a network 103. Computing device 101 may be any type of computing device (e.g., portable computing unit, Personal Digital Assistant (PDA), smartphone, laptop computer, mobile phone, navigation device, game console, desktop computer system, workstation, Internet appliance and the like) configured with the capability of connecting to database 102 via network 103. A hardware configuration of a computing device 101 is discussed below in connection with FIG. 2.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Database 102 is configured to store a set of facial signatures to be compared with the facial signatures of the faces detected in the images added to a multimedia document (e.g., yearbook, slideshow, video, website) as discussed further below in connection with FIGS. 3-4 and 5A-5B. While FIG. 1 illustrates a single database 102, network system 100 may include any number of databases 102 that stores the set of facial signatures to be compared with the facial signatures of the faces detected in the images added to a multimedia document as discussed further below.

Figure 2:
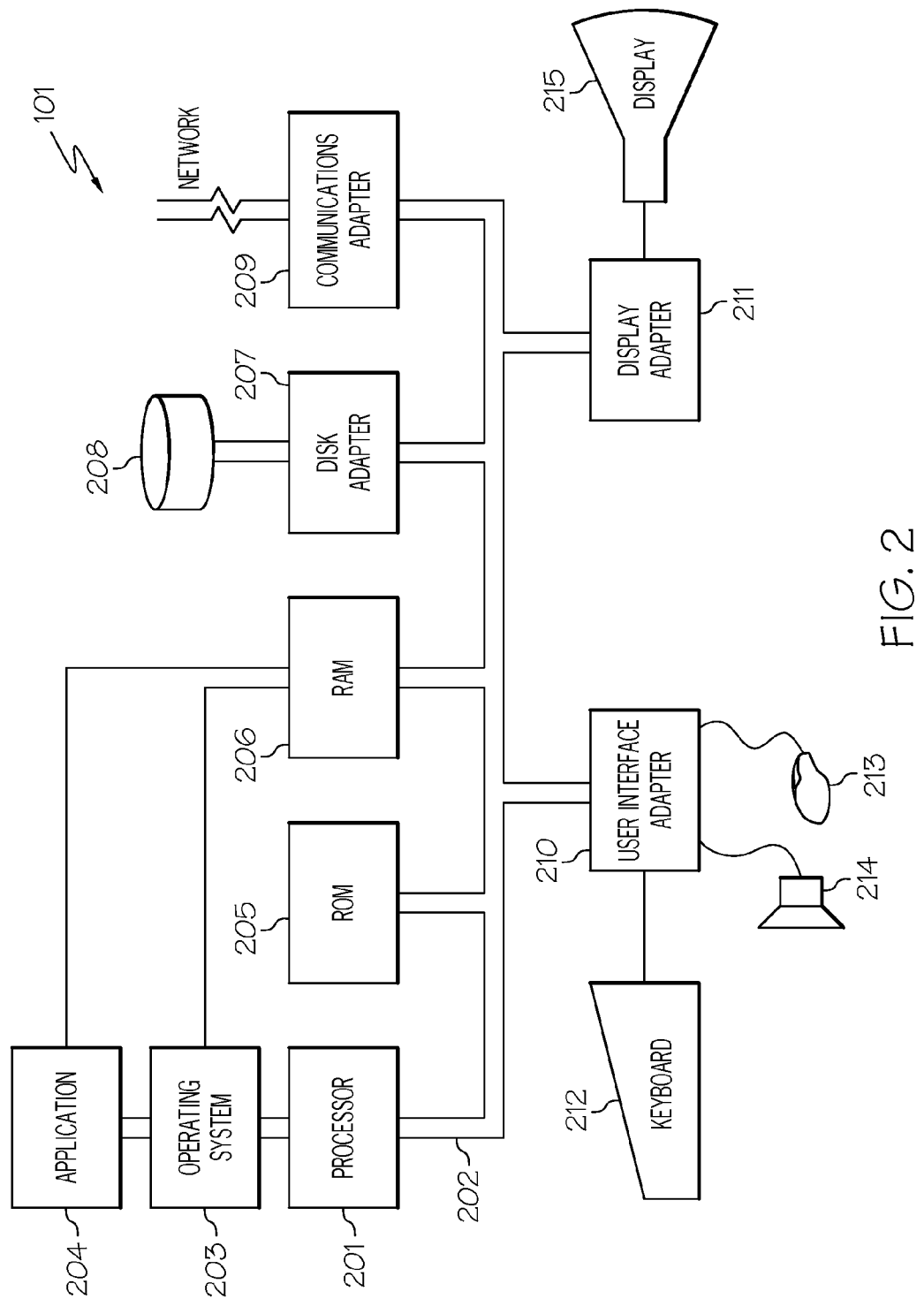
FIG. 2 illustrates a hardware configuration of a computing device for practicing the principles of the present invention in accordance with an embodiment of the present invention.

Referring now to FIG. 2, FIG. 2 illustrates a hardware configuration of a computing device 101 (FIG. 1) for practicing the principles of the present invention in accordance with an embodiment of the present invention.

As illustrated in FIG. 2, computing device 101 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, an application for ensuring a desired distribution of images in a multimedia document as discussed below in association with FIGS. 3-4 and 5A-5B.

Referring again to FIG. 2, read-only memory ("ROM") 205 is coupled to system bus 202 and includes a basic input/output system ("BIOS") that controls certain basic functions of computing device 101. Random access memory ("RAM") 206 and disk adapter 207 are also coupled to system bus 202. It should be noted that software components including operating system 203 and application 204 may be loaded into RAM 206, which may be computing device's 101 main memory for execution. Disk adapter 207 may be an integrated drive electronics ("IDE") adapter that communicates with a disk unit 208, e.g., disk drive. It is noted that the program for ensuring a desired distribution of images in a multimedia document, as discussed below in association with FIGS. 3-4 and 5A-5B, may reside in disk unit 208 or in application 204.

Computing device 101 may further include a communications adapter 209 coupled to bus 202. Communications adapter 209 interconnects bus 202 with an outside network (e.g., network 103 of FIG. 1) thereby enabling computing device 101 to communicate with other devices, such as database 102 (FIG. 1).

I/O devices may also be connected to computing device 101 via a user interface adapter 210 and a display adapter 211. Keyboard 212, mouse 213 and speaker 214 may all be interconnected to bus 202 through user interface adapter 210. A display monitor 215 may be connected to system bus 202 by display adapter 211. In this manner, a user is capable of inputting to computing device 101 through keyboard 212 or mouse 213 and receiving output from computing device 101 via display 215 or speaker 214.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, generating a multimedia document, such as a yearbook or slideshow, that includes a set of images that is representative of all the individuals that belong to a group (e.g., sports team, class, school) is difficult, especially when the size of the group is large. For example, it takes a lot of effort and time in creating a yearbook for the graduating class of a high school that includes pictures of class members and school activities (e.g., sports). The creator(s) of the yearbook may want to ensure that a particular class member is not overly or inadequately represented in comparison to the other class members in order to provide fairness and increase member enjoyment. For example, the creator(s) of the yearbook may want to ensure that the yearbook does not include many images of a particular class member (e.g., twenty pictures of an individual) while only including a single image of another class member. However, the creator(s) of the yearbook may have hundreds or thousands of images of hundreds of class members to choose to include in the yearbook. As a result, it may be overwhelming for the creator(s) of the yearbook to ensure that each class member is adequately represented in the yearbook and that there are not some class members that are overly represented in the yearbook. Therefore, there is a need in the art for ensuring a desired distribution of images in a multimedia document (e.g., yearbook, slideshow, video, website).

Figure 3:
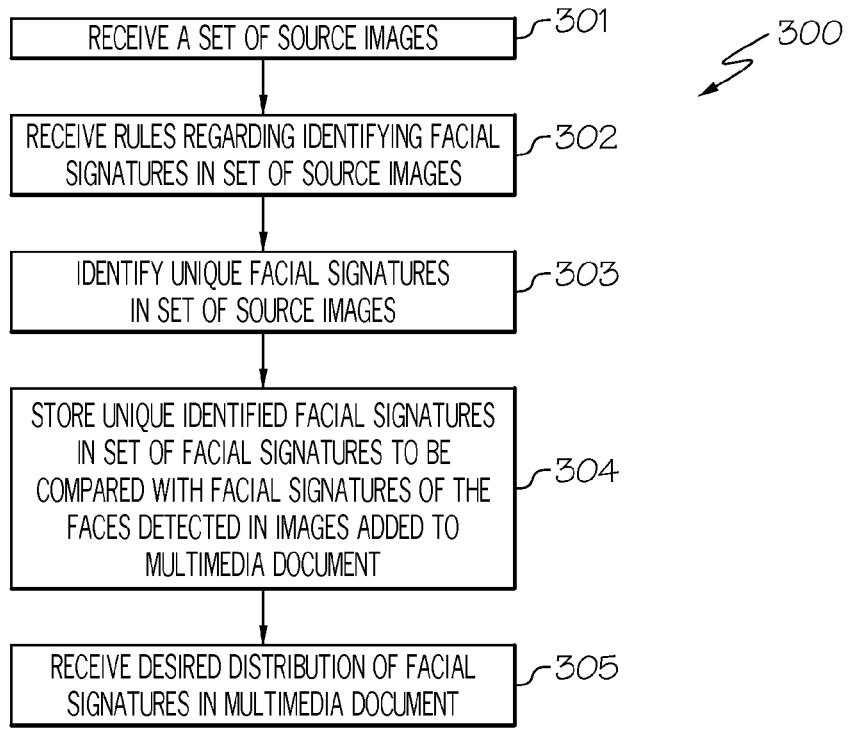
FIG. 3 is a flowchart of a method for establishing a set of facial signatures to be compared with facial signatures of the faces detected in images added to a multimedia document using a set of source images and rules regarding identifying facial signatures in the set of source images in accordance with an embodiment of the present invention.
Figure 4:
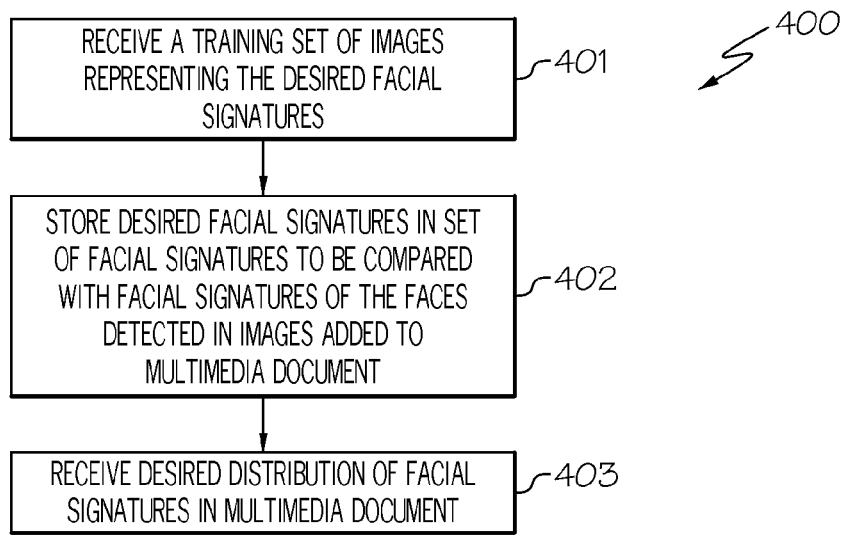
FIG. 4 is a flowchart of a method for establishing a set of facial signatures to be compared with facial signatures of the faces detected in images added to a multimedia document using a training set of desired facial signatures in accordance with an embodiment of the present invention.
Figure 5A:
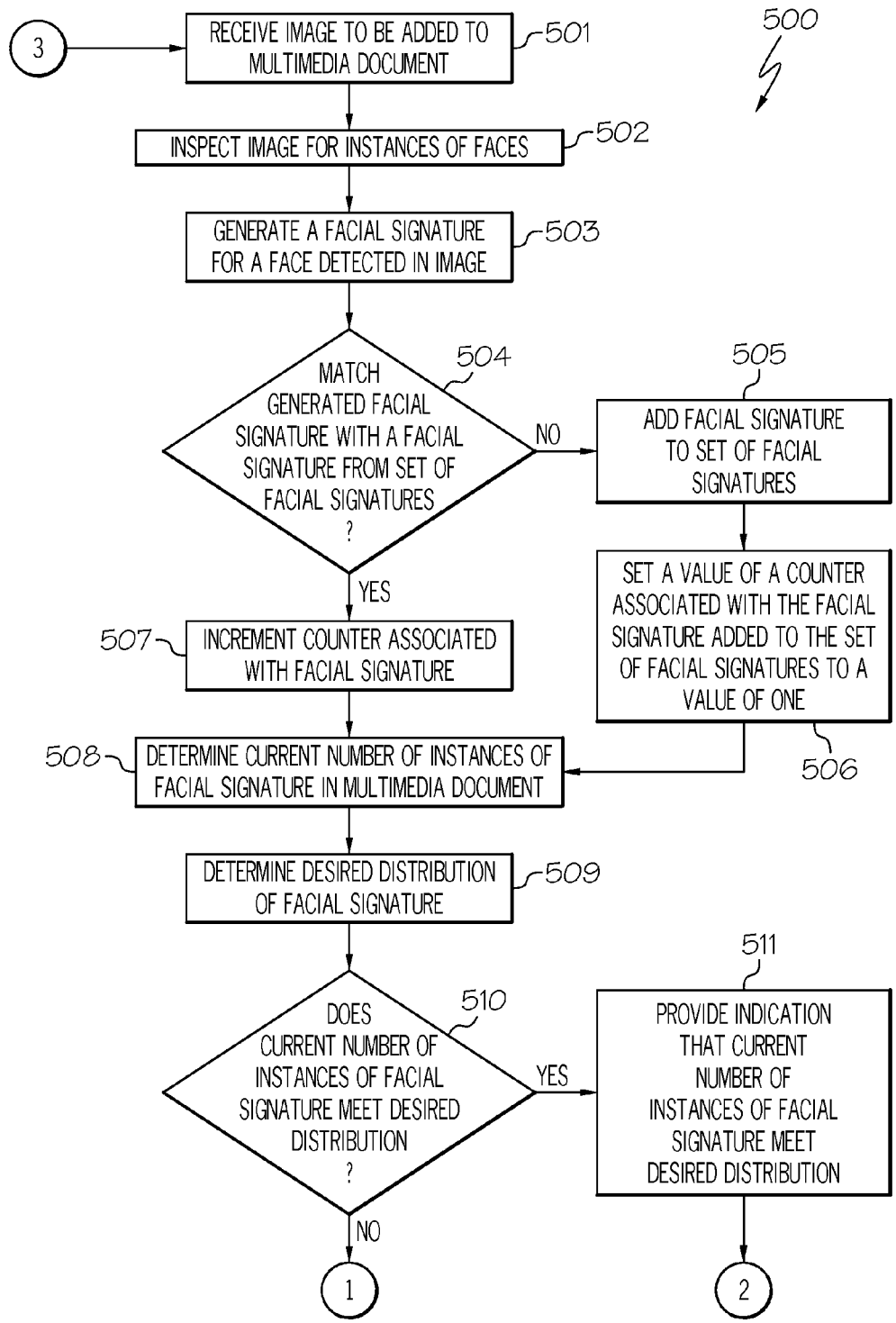
FIGS. 5A-5B are a flowchart of a method for ensuring a desired distribution of images in a multimedia document in accordance with an embodiment of the present invention.
Figure 5B:
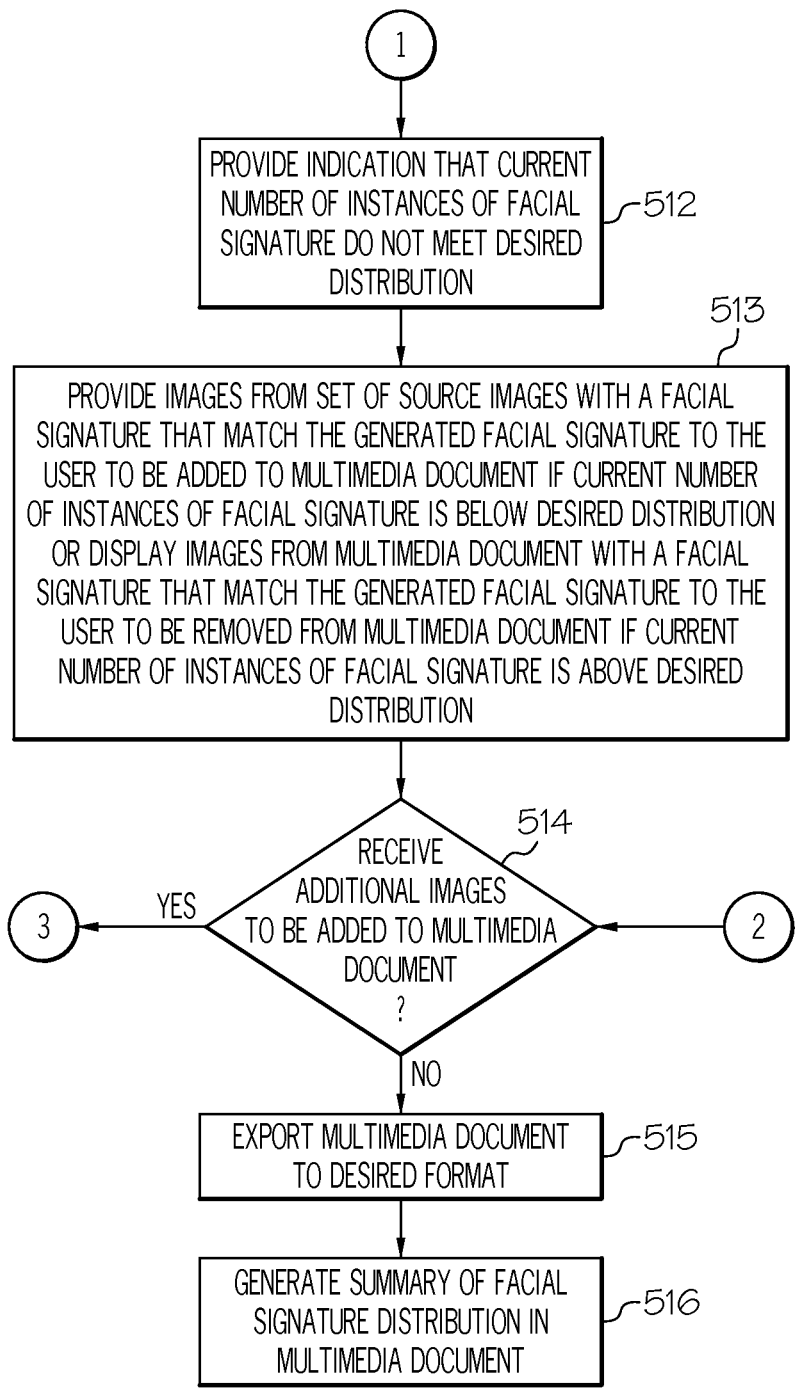

The principles of the present invention provide a means for ensuring a desired distribution of images in a multimedia document by utilizing facial signatures as discussed below in connection with FIGS. 3-4 and 5A-5B. FIG. 3 is a flowchart of a method for establishing a set of facial signatures to be compared with facial signatures of the faces detected in images added to a multimedia document using a set of source images and rules regarding identifying facial signatures in the set of source images. FIG. 4 is a flowchart of a method for establishing a set of facial signatures to be compared with facial signatures of the faces detected in images added to a multimedia document using a training set of desired facial signatures. FIGS. 5A-5B are a flowchart of a method for ensuring a desired distribution of images in a multimedia document.

As stated above, FIG. 3 is a flowchart of a method 300 for establishing a set of facial signatures to be compared with faces detected in images added to a multimedia document using a set of source images and rules regarding identifying facial signatures in the set of source images in accordance with an embodiment of the present invention.

Referring to FIG. 3, in conjunction with FIGS. 1-2, in step 301, computing device 101 receives a set of source images. These source images may or may not be included in the multimedia document to be created by a user of computing device 101. These source images are to be used to generate a set of facial signatures that will be compared with facial signatures of the faces detected in images added to the multimedia document as discussed further below.

In step 302, computing device 101 receives rules regarding identifying facial signatures in the set of source images. For example, there could be a rule that images with more than a particular number of faces (e.g., a group photograph with a large number of individuals) do not need to be analyzed. In another example, there could be a rule to group images containing a specific facial signature together. In a further example, contiguous images containing a specific facial signature (e.g., a space signature across the document) could be disallowed. These rules are exemplary and the principles of the present invention are to include any rules that may be used to specify which images may be analyzed to identify facial signatures.

In step 303, computing device 101 identifies unique facial signatures in the set of source images. In one embodiment, computing device 101 identifies unique facial signatures in the set of source images utilizing a facial recognition algorithm.

In step 304, computing device 101 stores the identified unique facial signatures in a set of facial signatures to be compared with the facial signatures of the faces detected in the images added to the multimedia document as discussed further below in connection with FIGS. 5A-5B.

In step 305, computing device 101 receives a desired distribution of facial signatures in a multimedia document to be created by the user of computing device 101. For example, the user may specify that all facial signatures should have 5 to 10 occurrences in the multimedia document. In another example, the user could assign weights to specific facial signatures in the set of facial signatures that are displayed to the user (e.g., via display 215). Such weights may be used to determine how many of each facial signature should occur in the multimedia document. In a further example, the default distribution of the facial signatures in the multimedia document is to be equal if the user does not provide any input.

In an alternative embodiment, the set of facial signatures to be compared with facial signatures of the faces detected in images added to a multimedia document may be established using a training set of desired facial signatures as discussed below in connection with FIG. 4.

FIG. 4 is a flowchart of a method 400 for establishing a set of facial signatures to be compared with facial signatures of the faces detected in images added to a multimedia document using a training set of desired facial signatures in accordance with an embodiment of the present invention.

Referring to FIG. 4, in conjunction with FIGS. 1-2, in step 401, computing device 101 receives a training set of images representing the desired facial signatures. In such an embodiment, the training set may be used to assist computing device 101 to know which facial signatures are to be included in the multimedia document to be created by the user.

In step 402, computing device 101 stores the desired facial signatures in a set of facial signatures to be compared with the facial signatures of the faces detected in the images added to the multimedia document as discussed further below in connection with FIGS. 5A-5B.

In step 403, computing device 101 receives a desired distribution of facial signatures in a multimedia document to be created by the user of computing device 101. As discussed above, for example, the user may specify that all facial signatures should have 5 to 10 occurrences in the multimedia document. In another example, the user could assign weights to specific facial signatures in the set of facial signatures that are displayed to the user (e.g., via display 215). Such weights may be used to determine how many of each facial signature should occur in the multimedia document. In a further example, the default distribution of the facial signatures in the multimedia document is to be equal if the user does not provide any input.

The images, such as images of class members in a class, are appropriately distributed in a multimedia document (e.g., yearbook) using the desired distribution of facial signatures as discussed below in connection with FIGS. 5A-5B.

FIGS. 5A-5B are a flowchart of a method 500 for ensuring a desired distribution of images in a multimedia document (e.g., yearbook, slideshow, video, website) in accordance with an embodiment of the present invention.

Referring to FIG. 5A, in conjunction with FIGS. 1-4, in step 501, computing device 101 receives an image to be added to the multimedia document.

In step 502, computing device 101 inspects the image for instances of faces (faces of individuals).

In step 503, computing device 101 generates a facial signature for a face detected in the image. In one embodiment, computing device 101 generates a facial signature for a face detected in the image utilizing a facial recognition algorithm. In one embodiment, if computing device 101 cannot generate a facial signature for the face detected in the image utilizing a facial recognition algorithm, then computing device 101 may determine if the face detected in the image is tagged thereby indicating a particular individual and determine if the known individual has an associated facial signature. In one embodiment, such facial signatures are stored in database 102.

In step 504, a determination is made by computing device 101 as to whether there is a match between the generated facial signature with a facial signature from the set of facial signatures (discussed above in connection with steps 304 and 402).

If there is not a match with a facial signature in the set of facial signatures, then, in step 505, the generated facial signature is added to the set of facial signatures.

In step 506, computing device 101 sets a value of a counter associated with the facial signature added to the set of facial signatures to a value of one. In one embodiment, the counter is implemented in software (e.g., application 204). In another embodiment, the counter is implemented in hardware or a combination of hardware and software.

If, however, there is a match with a facial signature in the set of facial signatures, then, in step 507, computing device 101 increments a counter associated with the facial signature. In this manner, the number of instances of the facial signature in the multimedia document will be known. Furthermore, by utilizing a counter, a mapping of the person's identity to the facial signature is not required thereby preserving the privacy of the individual. In one embodiment, the counter is implemented in software (e.g., application 204). In another embodiment, the counter is implemented in hardware or a combination of hardware and software.

Upon setting a value of a counter associated with the facial signature added to the set of facial signatures to a value of one in step 506 or upon incrementing the counter associated with the facial signature in step 507, in step 508, computing device 101 determines the current number of instances of the facial signature in the multimedia document. For example, the current number of instances of the facial signature in the multimedia document will be equal to the value of the counter discussed in connection with steps 506, 507.

In step 509, computing device 101 determines the desired distribution of the facial signature (facial signature generated in step 503) based on the received desired distribution of the facial signatures in the multimedia document (see steps 305 and 403). For example, the desired distribution of the facial signatures in the multimedia document received in steps 305 and 403 may indicate that the number of images with the facial signature generated in step 503 to be included in the multimedia document is to correspond to the average number of images of the other facial signatures used in the multimedia document.

In step 510, a determination is made by computing device 101 as to whether the current number of instances of the facial signature (facial signature generated in step 503) meet the desired distribution.

If the current number of instances of the facial signature (facial signature generated in step 503) meets the desired distribution, then, in step 511, computing device 101 provides an indication that the current number of instances of the facial signature (facial signature generated in step 503) meets the desired distribution. For example, computing device 101 may issue a notification (e.g., textual notification with a green color) to the user indicating that the current number of instances of the facial signature (facial signature generated in step 503) meets the desired distribution upon the user adding the image to the multimedia document.

Referring to FIG. 5B, in conjunction with FIGS. 1-4, if, however, the current number of instances of the facial signature (facial signature generated in step 503) does not meet the desired distribution, then, in step 512, computing device 101 provides an indication that the current number of instances of the facial signature (facial signature generated in step 503) does not meet the desired distribution. For example, computing device 101 may issue a notification (e.g., textual notification with a red color) to the user indicating that the current number of instances of the facial signature (facial signature generated in step 503) is below the desired distribution upon the user adding the image to the multimedia document. That is, computing device 101 may issue a notification indicating that additional images with the corresponding facial signature need to be added to the multimedia document to reach the desired distribution. In another example, computing device 101 may issue a notification (e.g., textual notification with an orange color) to the user indicating that the current number of instances of the facial signature (facial signature generated in step 503) is below the desired distribution upon the user adding the image to the multimedia document. That is, computing device 101 may issue a notification indicating that images with the corresponding facial signature need to be removed from the multimedia document to reach the desired distribution.

In step 513, computing device 101 provides images from the set of source images (received in step 301) with a facial signature that match the generated facial signature (generated in step 503) to the user to be added to the multimedia document if the current number of instances of the facial signature (facial signature generated in step 503) is below the desired distribution or displays the images from the multimedia document with a facial signature that match the generated facial signature (generated in step 503) to the user to be removed from the multimedia document if the current number of instances of the facial signature (facial signature generated in step 503) is above the desired distribution. For example, if the desired distribution of the generated facial signature is to have four images with the corresponding facial signature in the multimedia document and there are only two such images in the multimedia document, then computing device 101 may provide an indication that additional images with the corresponding facial signature need to be added to the multimedia document. Furthermore, computing device 101 may identify images from the set of source images that match the generated facial signature (generated in step 503), such as by using a facial recognition algorithm, that have not yet been added to the multimedia document thereby providing the user an opportunity to add additional images with the corresponding facial signature to the multimedia document to meet the desired distribution. In another example, if the desired distribution of the generated facial signature is to have four images with the corresponding facial signature in the multimedia document and there are five such images in the multimedia document, then computing device 101 may provide an indication that images with the corresponding facial signature need to be removed from the multimedia document. Furthermore, computing device 101 may identify images from the multimedia document that match the generated facial signature (generated in step 503), such as by using a facial recognition algorithm, that may be removed from the multimedia document thereby providing the user an opportunity to remove images with the corresponding facial signature from the multimedia document to meet the desired distribution.

In this manner, the user can ensure a desired distribution of images in the multimedia document (e.g., yearbook, slideshow, video, website).

Upon providing an indication that the current number of instances of the facial signature (facial signature generated in step 503) meets the desired distribution in step 511 or upon executing step 513, in step 514, a determination is made by computing device 101 as to whether the user provides additional images to be added to the multimedia document. If the user has additional images to be added to the multimedia document, then computing device 101 receives an additional image to be added to the multimedia document in step 501.

If, however, the user has completed the creation of the multimedia document, then, in step 515, computing device 101 exports the multimedia document to a desired format.

In step 516, computing device 101 generates a summary of the facial signature distribution in the multimedia document for the user.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for ensuring a desired distribution of images in a multimedia document, the method comprising:
receiving, by a processor, a desired distribution of facial signatures in said multimedia document;
receiving, by said processor, an image to be added to said multimedia document;
inspecting, by said processor, said image for instances of faces;
generating, by said processor, a facial signature for a face detected in said image;
determining, by said processor, a number of instances of said facial signature in said multimedia document;
determining, by said processor, a desired distribution for said facial signature in said multimedia document based on said received desired distribution of facial signatures in said multimedia document;
providing, by said processor, an indication that said number of instances of said facial signature in said multimedia document meets or does not meet said desired distribution for said facial signature in said multimedia document based on said number of instances of said facial signature in said multimedia document and said desired distribution for said facial signature in said multimedia document; and
incrementing by said processor a counter associated with the number of instances of said facial signature in said multimedia document in response to said facial signature matching a facial signature in a set of facial signatures to be compared with facial signatures of faces detected in images added to said multimedia document.

2. The method as recited in claim 1 further comprising:
receiving a set of source images;
receiving rules regarding identifying facial signatures in said set of source images;
identifying unique facial signatures in said set of source images; and
storing said identified unique facial signatures in a set of facial signatures to be compared with facial signatures of faces detected in images added to said multimedia document.

3. The method as recited in claim 2 further comprising:
providing images to a user from said set of source images with a facial signature that match said facial signature to be added to said multimedia document in response to said number of instances of said facial signature in said multimedia document being below said desired distribution for said facial signature in said multimedia document.

4. The method as recited in claim 1 further comprising:
displaying images to a user from said multimedia document with a facial signature that match said facial signature to be removed from said multimedia document in response to said number of instances of said facial signature in said multimedia document being above said desired distribution for said facial signature in said multimedia document.

5. The method as recited in claim 1 further comprising:
receiving a training set of images representing desired facial signatures; and
storing said training set of images representing desired facial signatures in a set of facial signatures to be compared with facial signatures of faces detected in images added to said multimedia document.

6. The method as recited in claim 1 further comprising:
adding said facial signature to a set of facial signatures to be compared with faces detected in images added to said multimedia document in response to said facial signature not matching a facial signature in said set of facial signatures.

7. The method as recited in claim 1 further comprising:
generating a summary of a facial signature distribution in said multimedia document.

8. The method as recited in claim 1, wherein said multimedia document comprises one of the following: a yearbook, a slideshow, a video and a web site.

* * * * *